May 14, 1968  D. R. HOUGH  3,382,907

VEHICLE TIRE ANTI-SKID TREAD

Filed Oct. 20, 1965

INVENTOR.
DEAN R. HOUGH
BY
William J. Ruano
his ATTORNEY

3,382,907
VEHICLE TIRE ANTI-SKID TREAD
Dean R. Hough, 3901 Nantasket St., Pittsburgh, Pa. 15207
Filed Oct. 20, 1965, Ser. No. 498,832
3 Claims. (Cl. 152—330)

ABSTRACT OF THE DISCLOSURE

This invention relates to a vehicle tire construction having a venting and reinforcing layer interposed between the casing ply layers and tread layer. The venting layer is composed of closely spaced cords encased in a rubber sheet with widely spaced bleeder cords attached along the top and bottom surface thereof to provide a continuous venting path between the casing ply cords and the sidewall of the tire adjacent the shoulder portion.

---

This invention relates generally to a vehicle tire construction and to the method of making such tire and, more particularly, to a new tire construction which is made in the manner so as to completely eliminate any tendency of creating air pockets between the tread rubber and base rubber of the casing. This invention is an improvement over that covered by my prior Patent 3,024,823, dated Mar. 13, 1962.

One of the most serious problems which has plagued the tire industry for many years is that of the tendency of separation of the tread rubber from the base rubber layer of the casing as a consequence of development of air pockets therebetween. In the manufacture of new tires, the carcass, including several plies of nylon or similar material is stretched out into flat condition and while pressure is applied by an air bag on the surface that will become the inner surface of the tire, the tread layer is adhered to the outer surface of the base rubber. In the interface therebetween, there is a tendency for the development of small air pockets which are not usually harmful under normal conditions. However, as the tire heats up abnormally, as a consequence of driving great distances in hot summer weather, the air in the pockets will become heated and will expand in size and will often times cause separation of the tread from the base rubber, resulting in blowouts which are very apt to cause accidents which often times are fatal to the occupants of the vehicle.

An object of the present invention is to provide a novel tire construction and method of fabricating a tire which will completely eliminate any tendency for the build-up of air pockets or expansion in size of any existing minute air pockets, therefore overcoming the abovenamed disadvantages of conventional tire construction and preventing the tendency of separation of the tread layer from rubber base layer on the carcass of the vehicle tire.

A more specific object of the invention is to interpose or sandwich one or more plied layers containing bleeder cords between the outermost ply or breaker strip of the carcass and the tread layer and to have the ends of the bleeder cords emerge outwardly through the sidewalls of the tire at the shoulder area so as to provide air vents for expelling air from any pockets that may develop in any of the plies existing in the carcass, thereby providing a tire which can be safely driven at very high summer temperatures and for very long periods of time without any possibility of separation of the tread layer that might possibly result in a fatal accident.

Figure 1:
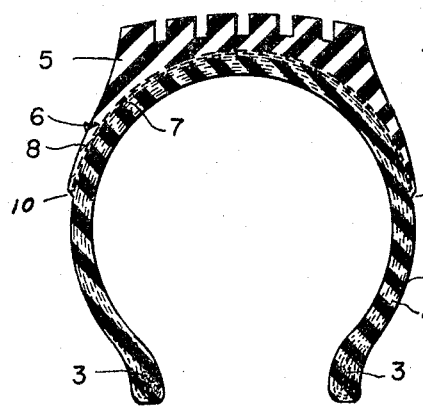
Figure 2:
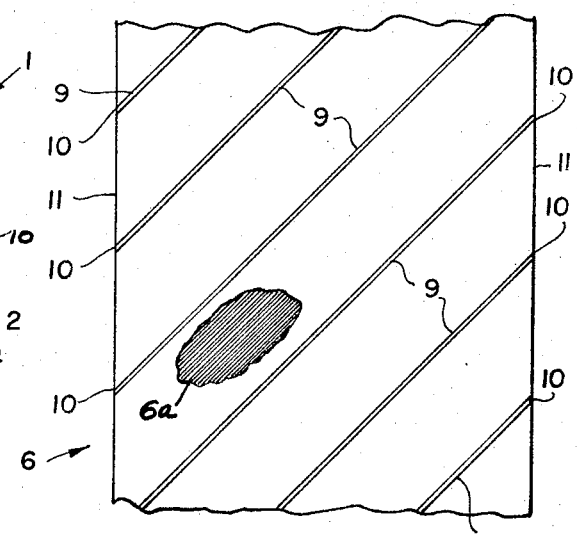
Figure 3:
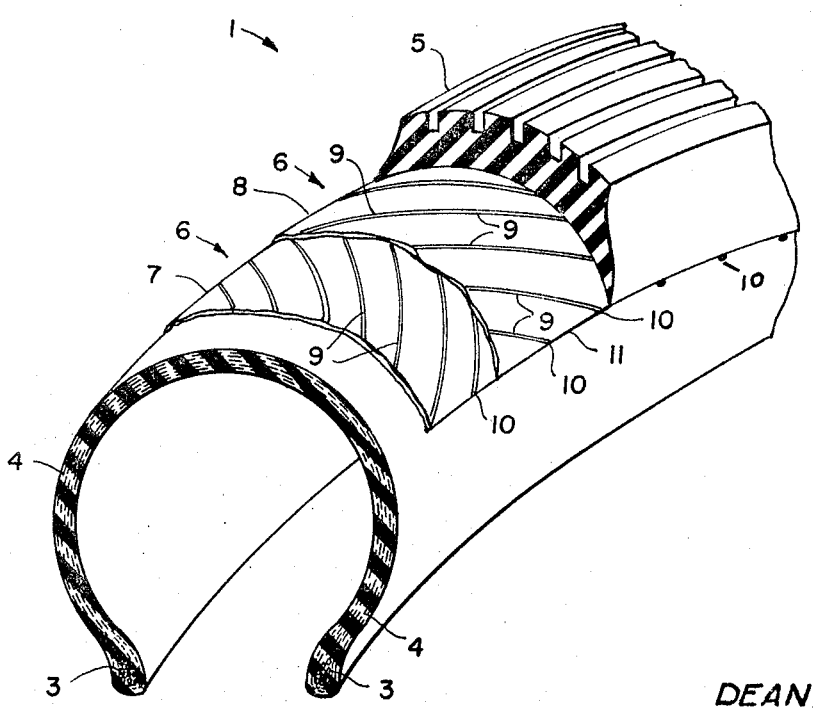

Other objects and advantages will become more apparent from a study of the following description taken with the accompanying drawing wherein:

FIG. 1 is a cross-sectional view of a new vehicle tire embodying the principles of the present invention;

FIG. 2 is a fragmentary plan view, with a part of the surface layer cut-away, of a ply layer which is applied between the carcass and tread layer 5, as shown more clearly in FIGS. 1 and 3; and, FIG. 3 is a perspective view, with the carcass and tread layer shown in cross-section but in staggered relationship for more clearly illustrating the two ply layers 6 sandwiched therebetween.

Referring more particularly to FIGS. 1 and 3 of the drawing, numeral 1 generally denotes a vehicle tire comprising a carcass having a plurality of plies 4 of nylon, rayon, cotton or other suitable material, which plies are wrapped, at the ends thereof about wire beads 3 to provide reinforcement to the carcass, in a well known manner.

In the fabrication of new tires, this carcass is extending in flat condition and while air pressure is applied on the inner or lower surface, tread layer 5 is adhered to the outer surface or base layer of rubber which covers the carcass.

In accordance with the present invention one or more layers or plies of cords, such as 6 shown in FIG. 2, are interposed between the base layer, that is, the outer surface of the tread layer 5, as shown more clearly in FIG. 3, to provide ventilation therebetween.

The construction of each ply strip 6 is shown more clearly in FIG. 2, which comprises a wide strip of very closely spaced and parallel arranged cords of nylon or rayon, such as shown at 6a, with outer surface layers of tacky rubber over the entire strip and with rubber separating the various closely spaced cords. In other words, each cord is separated from the adjoining cord and has an outer and inner surface coated with rubber and is thus completely encased in rubber. At wide intervals on both the outer and inner surfaces of each strip 6 is a plurality of parallel and angularly disposed bleeder cords 9 of cotton or other suitable material, such as rayon or nylon, particularly of multi-filar construction, to provide vents or passageways for air and terminating in ends 10.

In accordance with the present invention a ply-forming strip 6 is laid immediately next to the outermost ply layer or breaker strip on the outer surface of the carcass 4 as shown at 7 in FIG. 3, with the cords 9 running at an angle to the side edges or rims of the tire carcass. These bleeder cords are disposed at an angle of about 33° to 45° thereto. The ends 10 of the bleeder cords extend outwardly through the side walls at the shoulder area of the tread rubber 5 for expelling air passing through the bleeder cords 9. For many applications, a substantial improvement is obtained by applying a second ply layer 8 between the layer 7 and tread rubber 5, with the cords of layer 8 crossing or intersecting the cords of layer 7 so as to insure cross-connections between the various cords 9 of the respective layers 7 and 8. Thus, a grid net work of bleeder cords are provided to insure a leakage or vent path for any air or air pockets with which cords 9 are in communication. Since cords 9 have ends 10 which project at spaced intervals outside the sidewalls, they are preferably made of black color and are cut flush with the sidewalls so as not to be readily visible from the outside of the sidewall.

As an alternative to using one or two ply forming layers, such as 7 and 8, a network of cords in grid formation, such as the net 4 shown in my prior patent, may be substituted for the layers 6, with ends terminating through the sidewalls and in communication with the outer ply of the carcass, so as to fully insure venting of the various plies in the carcass, rather than to be spaced therefrom. In short, by the present invention, the aforesaid ply layer 6, or the grid net as shown in my prior patent is substantially in contact with the outermost ply layer of the carcass, or in communication therewith through bleeder cords 9 so that any air which develops in any of the ply layers will find a vent path through the bleeder cords 9 occurring between said layers and insure complete venting of the various plies 4 of the carcass.

While the above description relates to a new tire, the same ply layer or layers 6 may be used for recapped tires by first buffing to the outermost ply layer of the carcass, before applying the tread rubber. One or two layers 6, as shown in FIG. 3, may be adhered permanently to the camelback or tread rubber as a component part thereof, so that the composite layer with bleeder cords 9 may be applied directly to the buffed carcass, in contact with the outermost cord layer at least in part.

Thus it will be seen that I have provided an efficient tire construction suitable for either new tires or for retread tires, embodying a one or more ply layers sandwiched between the outermost ply of the carcass (or breaker strip) and the tread layer so as to insure that the entire ply assembly, that is, all the ply layers, will be vented through the sidewalls of the tire in the shoulder area where the heat is greatest.

While I have illustrated and described several embodiments of my invention, it will be understood that these are by way of illustration only, and that various changes and modifications may be made within the contemplation of my invention and within the scope of the following claims.

I claim:

1. A vehicle tire comprising a casing having a plurality of ply layers extending about the entire periphery thereof, a tread layer disposed outside thereof with two plied venting layers provided between the outermost ply of the carcass and said tread layer, each venting layer having a plurality of parallel, closely spaced cords completely coated with rubber to form a strip having more widely spaced bleeder cords on both outer surfaces of each strip, the bleeder cords of one strip disposed substantially crosswise of the bleeder cords of another strip and in contacting relationship therewith to form a venting network for venting air pockets through the sidewalls at the position where the edge of the tread layer joins the sidewalls of the tire.

2. A camelback tread layer for recapping a vehicle tire comprising a tread layer having permanently attached to the adhering surface thereof a strip of closely spaced cords, all of which are completely coated with tacky rubber, with widely spaced venting cords disposed in spaced parallel relationship on the outermost surface of said strip.

3. A vehicle tire comprising a casing having a plurality of ply layers of cord extending about the entire periphery thereof, a tread layer disposed outside thereof with a reinforcing and venting layer sandwiched between said tread layer and ply layers, said venting and reinforcing layer comprising closely spaced, parallel cords encased in a thin sheet of rubber with outer tacky surfaces, widely spaced, parallel disposed bleeder cords on said outer tacky surfaces disposed at an angle and in contact with the cords of the outermost ply layer, said closely spaced cords and bleeder cords extending outwardly of the sidewalls of said tire adjacent the shoulder portion of the tread layer so as to vent air pockets developed in or adjacent any of the ply layers.

References Cited
UNITED STATES PATENTS

| | | | |
|---|---|---|---|
| 2,007,825 | 7/1935 | Day | 152—330 |
| 3,024,827 | 3/1962 | Hough | 152—330 |

ARTHUR L. LA POINT, *Primary Examiner.*